US008244548B2

United States Patent
Carrato et al.

(10) Patent No.: US 8,244,548 B2
(45) Date of Patent: Aug. 14, 2012

(54) AUGMENTING SERVICE ORIENTED ARCHITECTURE GOVERNANCE MATURITY

(75) Inventors: Anthony L. Carrato, New Milford, CT (US); Clive S. Gee, Shetland (GB); David B. Hodge, Singapore (SG); Robert G. Laird, Colorado Springs, CO (US); Randall L. Langel, Newport Beach, CA (US); Ian W. Y. Loe, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 12/338,516

(22) Filed: Dec. 18, 2008

(65) Prior Publication Data

US 2010/0161454 A1 Jun. 24, 2010

(51) Int. Cl.
*G06Q 10/00* (2012.01)
(52) U.S. Cl. ......... 705/1; 705/7.11; 705/7.12; 705/7.28; 705/7.29; 705/7.36; 705/38; 705/70; 705/346
(58) Field of Classification Search .................. None
See application file for complete search history.

(56) References Cited

U.S. PATENT DOCUMENTS

| | | | |
|---|---|---|---|
| 6,675,149 B1 * | 1/2004 | Ruffin et al. | 705/7.12 |
| 7,613,625 B2 * | 11/2009 | Heinrich | 705/7.28 |
| 2004/0193703 A1 | 9/2004 | Loewy et al. | |
| 2006/0235733 A1 * | 10/2006 | Marks | 705/7 |
| 2006/0247936 A1 * | 11/2006 | Khusial et al. | 705/1 |
| 2007/0192236 A1 * | 8/2007 | Futch et al. | 705/38 |
| 2008/0249825 A1 * | 10/2008 | Kunjur et al. | 705/8 |
| 2009/0063212 A1 * | 3/2009 | Isom | 705/7 |
| 2009/0064087 A1 | 3/2009 | Isom | |
| 2009/0157419 A1 * | 6/2009 | Bursey | 705/1 |

(Continued)

FOREIGN PATENT DOCUMENTS

WO    WO2007143516    * 12/2007

OTHER PUBLICATIONS

Hollrigl, T. et al. "Towards Systematic Engineering of Service-Oriented Access Control in Federated Environments," Congress on Services Part II, 2008. Services-2. IEEE, vol., no., pp. 104-111, Sep. 23-26, 2008. Inaganti et al. "SOA Maturity Model" (Apr. 2007) BP Trends.*

(Continued)

*Primary Examiner* — Robert Niquette
(74) *Attorney, Agent, or Firm* — H. Barrett Spraggins; John R. Pivnichny; Biggers & Ohanian, LLP.

(57) ABSTRACT

Augmenting service oriented architecture ('SOA') governance maturity including receiving an evaluation of the maturity of the governance of the SOA; identifying, for each governance capability in dependence upon the evaluation of the maturity of the governance capability, one or more predefined risks to the SOA; establishing, for each governance capability in dependence upon the predefined risks to the SOA, a risk value representing the severity of the predefined risks; selecting, for each governance capability in dependence upon the evaluation of the maturity of the governance of the SOA and the predefined risk value, one or more governance work products; and communicating to predetermined stakeholders in the SOA the one or more predefined risks to the SOA identified for each governance capability, the risk value established for each governance capability, and the governance work products selected for each governance capability.

18 Claims, 6 Drawing Sheets

U.S. PATENT DOCUMENTS

| | | | |
|---|---|---|---|
| 2009/0192867 A1 | 7/2009 | Farooq et al. | |
| 2009/0198534 A1* | 8/2009 | Brown et al. | 705/7 |
| 2009/0198537 A1* | 8/2009 | Brown et al. | 705/7 |
| 2010/0036704 A1* | 2/2010 | Romano, Jr. | 705/8 |
| 2010/0131326 A1* | 5/2010 | Channabasavaiah et al. | 705/9 |
| 2010/0138250 A1* | 6/2010 | Brown et al. | 705/7 |
| 2010/0138252 A1* | 6/2010 | Brown et al. | 705/7 |
| 2010/0138254 A1* | 6/2010 | Brown et al. | 705/7 |
| 2010/0145750 A1* | 6/2010 | Carrato et al. | 705/7 |

OTHER PUBLICATIONS

Inaganti et al. "SOA Maturity Model" (Apr. 2007) BP Trends.*
"Domain Model for SOA—Realizing the Business Benefit of Service-Oriented Architecture" (Jul. 2005) BEA Systems.
Sonic Corporation et al. "A New Service-Oriented Architecture (SOA) Maturity Model" (2005).
Windley et al. "SOA Governance: Rules of the Game" (2006) Infoworld.com Jan. 23, 2006, p. 29-35.
Hollrigl, T.;Schell, F.;Suelmann, S.;Hartenstein, H.;,"Towards Systematic Engineering of Service-Oriented Access Control in Federated Environments," Congress on Services Part !!, 2008. Services-2 IEE, vol, no, pp. 104-111, Sep. 23-26, 2008 doi: 10.1109/SERVICES-2.2008.24 URL:http://ieeexplore.ieee.org/stamp/stamp.jsp?tp=&arnumber=4700506&.
Office Action, U.S. Appl. No. 12/330,821, Feb. 8, 2011.
Final Office Action, U.S. Appl. No. 12/330,821, May 20, 2011.
Office Action, U.S. Appl. No. 12/338,516, Sep. 20, 2011.

* cited by examiner

AUGMENTING SERVICE ORIENTED ARCHITECTURE GOVERNANCE MATURITY

BACKGROUND OF THE INVENTION

1. Field of the Invention

The field of the invention is data processing, or, more specifically, methods, systems, and products for augmenting service oriented architecture ('SOA') governance maturity.

2. Description of Related Art

Service Oriented Architecture ('SOA') is an architectural style that guides all aspects of creating and using business processes, packaged as services, throughout their lifecycle, as well as defining and provisioning the IT ('information technology') infrastructure that allows different applications to exchange data and participate in business processes loosely coupled from the operating systems and programming languages underlying those applications. SOA represents a model in which functionality is decomposed into distinct units (services), which can be distributed over a network and can be combined together and reused to create business applications. These services communicate with each other by passing data from one service to another, or by coordinating an activity between two or more services. The concepts of Service Oriented Architecture are often seen as built upon, and the evolution of, the older concepts of distributed computing and modular programming. Although services and a business's SOA architecture are often strictly defined, governance of an SOA, implementation of an SOA, operation of an SOA, and management of an SOA is often not defined. A defined model of governance, however, may increase effectiveness and efficiency in implementing, operating, and managing a business's SOA, thereby providing savings to the business. The maturity of that SOA governance may vary from organization to organization.

SUMMARY OF THE INVENTION

Augmenting service oriented architecture ('SOA') governance maturity including receiving an evaluation of the maturity of the governance of the SOA; identifying, for each governance capability in dependence upon the evaluation of the maturity of the governance capability, one or more predefined risks to the SOA; establishing, for each governance capability in dependence upon the predefined risks to the SOA, a risk value representing the severity of the predefined risks; selecting, for each governance capability in dependence upon the evaluation of the maturity of the governance of the SOA and the predefined risk value, one or more governance work products; and communicating to predetermined stakeholders in the SOA the one or more predefined risks to the SOA identified for each governance capability, the risk value established for each governance capability, and the governance work products selected for each governance capability.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary Architecture

Figure 1:
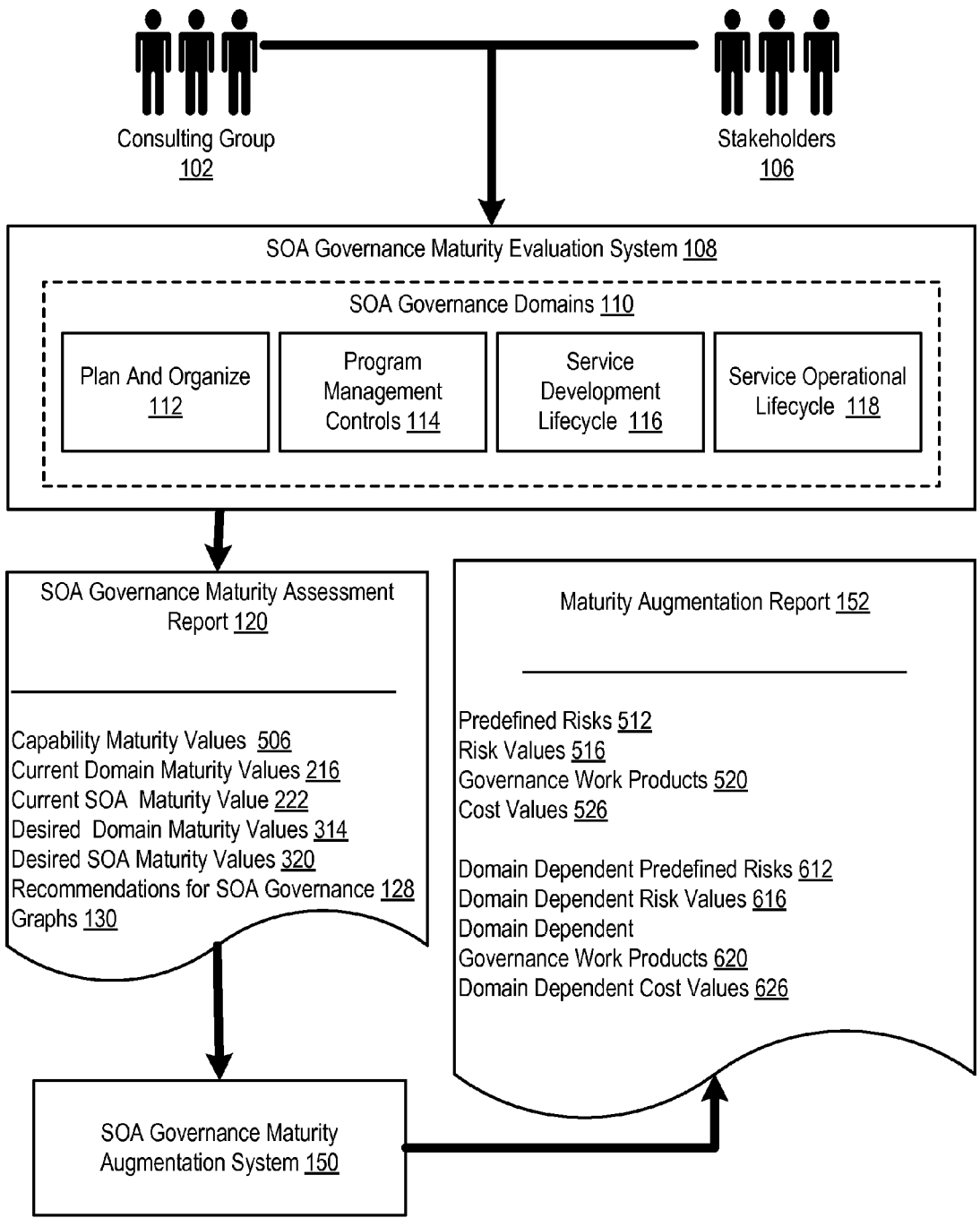
FIG. 1 sets forth a block diagram of a system for evaluating service oriented architecture ('SOA') governance maturity and a system for augmenting SOA governance maturity according to embodiments of the present invention.

Exemplary methods, systems, and products for evaluating service oriented architecture ('SOA') governance maturity in accordance with the present invention are described with reference to the accompanying drawings, beginning with FIG. 1. FIG. 1 sets forth a block diagram of a system for evaluating service oriented architecture ('SOA') governance maturity and a system for augmenting SOA governance maturity according to embodiments of the present invention. SOA is an architectural style that guides all aspects of creating and using business processes, packaged as services, throughout their lifecycle, as well as defining and provisioning the information technology ('IT') infrastructure that allows different applications to exchange data and participate in business processes loosely coupled from the operating systems and programming languages underlying those applications. SOA represents a model in which functionality is decomposed into distinct units, called services, which can be distributed over a network, can be combined together, and reused to create business applications. These services communicate with each other by passing data from one service to another, or by coordinating an activity between two or more services. The concepts of Service Oriented Architecture are often seen as built upon, and the evolution of, the older concepts of distributed computing and modular programming.

SOA governance implements the set of rules, practices, roles, responsibilities and agreements—whether formal or informal—that organize work on the SOA being governed. The maturity of an SOA governance program is an indication of the degree of development, experience, and reliability of the governance of the SOA. As such, a more developed, experienced, and reliable SOA governance program is more mature than a less developed, experienced, and reliable SOA governance program.

The system of FIG. 1 includes an SOA governance maturity system (108) capable of evaluating service oriented architecture ('SOA') governance maturity according to embodiments of the present invention. In the example of FIG. 1, the SOA governance maturity system (108) receives, from a plurality of predetermined stakeholders (106) in the SOA for a plurality of SOA governance capabilities, a stakeholder assessed value representing the current maturity of each of the plurality of SOA governance capabilities. A stakeholder (106) of a business may be any individual or party that affects, or can be affected by, a business's SOA actions. The "predetermined stakeholders," as the term is used in this specification, refers to stakeholders that have been selected to provide information regarding the maturity of the governance of the SOA. Such predetermined stakeholders are typically the stakeholders that are often the most directly affected by the business's actions with respect to SOA and have been given decision making authority with regard to one or more aspects of the SOA governance model.

SOA governance capabilities are the governance practices of granular aspects of the SOA. Such governance capabilities are each an individual portion of the overall SOA governance and individually implement the rules, practices, roles, responsibilities, and agreements with respect to specific part the governance of the SOA. Examples of specific SOA governance capabilities include:

Service Transformation Planning—Capability to identify and plan for the set of services, especially business services, that support the to-be agile business process.

Information Transformation Planning—Capability to create a reusable message model and to identify the set of information services that supports the business model.

Technology Transformation Planning—Capability to create and maintain a technology plan for standards and policies for hardware, software, development lifecycle, and services reference architectures in order to have a cost effective approach to the creation of services and business & IT agility.

Service Processes, Organizations. Roles and Responsibilities—Capability to guide the processes used for SOA Governance, including the organizations that are enhanced or created and the manner in which they interact with each other, as well as the roles and responsibilities of the personnel participating.

Manage the Service Investment—Capability to manage the investment of money to create services and business agility including creating a business case for the SOA, the business metrics to be monitored and used to rate the results of projects after completion, and input into the investment of future funding.

Business Vision & IT Alignment—Capability to create the business goals and be able to align IT in the support of those goals.

Service Portfolio Management—Capability to manage the process for selection of projects to be selected that demonstrates the ability to direct investment resources based on reuse capability and agile business service creation.

Service Ownership & Funding—Capability to identify and control who funds what services, who owns what services and how rights and obligations are distributed.

Service Governance Vitality—Capability to inspect and measure results of the SOA program, including SOA Governance and take corrective action as needed.

Service Communication Planning—Capability to plan and execute the communications of both the business and technical aspects of a services approach to all stakeholders. This includes the ability of the business to understand and lead the application of business processes, business services, business rules, and business metrics to create an agile enterprise.

Service Education & Training—Capability to educate and train stakeholders on take SOA approach Enterprise Program Management—Capability to effectively provide Program Management to ensure the delivery of SOA project results within agreed-upon time frames, budget and quality.

Change Management—Capability to manage the process of program change in responding to changing business requirements.

Procurement of Resources—Capability to manage the process of procuring IT resources in a cost efficient manner while meeting business requirements Vendor Management—Capability to manage, third-party vendors providing SOA services or resources Identify and Allocate Costs—Capability to identify and allocate costs of a services approach Monitor Business Benefits of SOA—Capability to monitor and provide a feedback loop on the business benefits of SOA Service Development Lifecycle Controls—Capability to govern the SvDLC with Control Gates or similar mechanisms Requirements Gathering & Prioritization—Capability to govern the creation of Business Requirements that support a flexible business Service Identification—Capability to govern the Service Identification process to support the identifying of business services and operations at the right level of granularity Service Specification—Capability to govern the Service Specification process to support the specification of business services and operations in a manner such that the services are readily built and deployed.

Service Realization—Capability to govern the Service Realization process to support the creation, maintenance, and testing of services.

Service Certification—Capability to govern the Service Certification process to support the certification of business services and operations in a manner such that the services are operationally ready for production.

Service Execution Monitoring—Capability to monitor and report results of required service level agreements (SLA's) for external services and operational level agreements (OLA's) for internal services, including identifying when there is acceptable and unacceptable service operations.

Service Operational Vitality—Capability to manage the operational vitality of quality of services. This includes service latency, service elapsed time, hardware and software quality in support for services, priority of services support, service versioning, and prioritized allocation of customer service support.

Service Support—Capability to manage the analysis and resolution of incidents affecting services quality.

The SOA governance capabilities listed above are provided for explanation and not for limitation. In fact, many additional SOA governance capabilities may occur to those of skill in the art and all such SOA governance capabilities may be useful in carrying out evaluating SOA governance maturity according to embodiments of the present invention.

A stakeholder assessed value representing the current maturity of each of the plurality of SOA governance capabilities according to the present invention is a value provided by each of the predetermined stakeholders representing the current maturity of that SOA governance capability. Such a stakeholder assessed value may be provided as a numerical value representing the maturity of the SOA governance capability in response to a questionnaire provided by a consulting group (102). In the example of FIG. 1 a questionnaire is provided by a consulting group (102) to the predetermined stakeholders (106) asking the stakeholders to provide a numerical value representing the current maturity of a plurality of SOA governance capabilities.

The use of numerical values in this specification is for explanation and not for limitation. In fact, evaluating SOA governance maturity according to embodiments of the present invention may usefully use values that are not numerical but implemented in other ways such as symbolic, alphabetical, alphanumeric, or any other manner of implementing a value that will occur to those of skill in the art.

The SOA governance maturity evaluation system of FIG. 1 is also capable of receiving, from the plurality of predetermined stakeholders (106) in the SOA for a plurality of SOA governance capabilities, a desired stakeholder maturity value representing a desired maturity of each of the plurality of SOA governance capabilities. A desired stakeholder maturity value according to the present invention is a value provided by each of the predetermined stakeholders representing a desired future maturity of that SOA governance capability. Such a desired stakeholder maturity value may be provided as a numerical value representing the desired maturity of the SOA governance capability in response to a questionnaire provided by a consulting group (102).

The SOA governance maturity evaluation system of FIG. 1 is capable of determining, for each of the plurality of SOA governance capabilities in dependence upon the plurality of stakeholder assessed values from the stakeholders, a capability value for each of the plurality of SOA governance capabilities. A capability value is a single value representing the maturity of the SOA governance capability. Such a value may be determined by averaging the stakeholder assessed values, using a weighted average of the stakeholder assessed values, using a predetermined formula other than an average, taking the median average, or any other way of determining a single value representing the maturity of the SOA capability from the stakeholder assessed capabilities that will occur to those of skill in the art.

The SOA governance maturity evaluation system of FIG. 1 is capable of determining, for each of the SOA governance capabilities in dependence upon the plurality of desired stakeholder maturity values, a desired capability value for each of the SOA governance capabilities. A desired capability value is a single value representing the desired future maturity of the SOA governance capability. Such a value may be determined by averaging the desired stakeholder maturity values, using a weighted average of the desired stakeholder maturity values, using a predetermined formula other than an average, taking the median average, or any other way of determining a single value representing the desired maturity of the SOA capability from the desired stakeholder maturity values that will occur to those of skill in the art.

The SOA governance maturity evaluation system of FIG. 1 is capable of assigning each of the SOA governance capabilities to a domain (110). A domain of SOA governance is a broader description of related SOA governance capabilities. Examples of such domains include:

Plan and Organize (112)—This domain is concerned with the governance of the strategy for SOA. It focuses on the planning and organization for an SOA-enabled transformation at all levels of an SOA Solution Stack including governance vitality, communications and training. These are not 'day to day' activities, but are strategic in nature and set the direction for the SOA and SOA Governance program as a whole. While not 'day to day', the decisions taken here will undergo review and change as the needs of the business change or as the enterprise continues to mature in its SOA journey.

Program Management Controls (114)—This domain focuses on uplifting the capability of the program management area in making the transition from a department or Line of Business project management capability to a true enterprise wide program management set of capabilities. It focuses specifically on how the program and individual projects manage SOA-related risks, including change management, procurement management, vendor management, and cost and benefits.

Service Development Lifecycle (116)—This Domain is focused on the standardization of the Service Development Lifecycle and the formalization of the governance controls needed in order to ensure service development quality of service.

Service Operational Lifecycle (118)—This area is focused on the standardization of the Service Operations Lifecycle and the formalization of the governance controls needed in order to ensure service operations quality of service.

The domains listed above are provided for explanation and not for limitation. In fact, many additional domains may occur to those of skill in the art and all such domains may be useful in carrying out evaluating SOA governance maturity according to embodiments of the present invention.

Assigning each of the exemplary SOA governance capabilities identified above to an exemplary domain identified above may result in the following domains associated with the following governance capabilities:

Plan and Organize (112)—Service Transformation Planning; Information Transformation Planning; Technology Transformation Planning; Service Processes, Organizations, Roles and Responsibilities; Manage the Service Investment; Business Vision & IT Alignment; Service Portfolio Management; Service Ownership & Funding; Service Governance Vitality; Service Communication Planning; and Service Education & Training Program Management Controls (114)—Enterprise Program Management; Change Management; Procurement of Resources; Vendor Management; Identify and Allocate Costs; and Monitor Business Benefits of SOA Service Development Lifecycle (116)—Service Development Lifecycle Controls; Requirements Gathering & Prioritization; Service Identification; Service Specification; Service Realization; and Service Certification Service Operational Lifecycle (118)—Service Execution Monitoring; Service Operational Vitality; and Service Support The SOA governance capabilities assigned to domains listed above are provided for explanation and not for limitation. In fact, many additional or different SOA governance capabilities may be assigned to additional or different domains may occur to those of skill in the art and all such assignments may be useful in carrying out evaluating SOA governance maturity according to embodiments of the present invention.

The SOA governance maturity evaluation system (108) of FIG. 1 is also capable of determining, in dependence upon the capability values for each of the plurality of SOA governance capabilities of each domain, a domain maturity value (216) for each domain. A domain maturity value is a single value representing the maturity of the governance of the domain. Such a value may be determined by averaging the capability values for each domain, using a weighted average of the capability values, using a predetermined formula other than an average of the capability values, taking the median average of the capability values, or any other way of determining a single value representing the maturity of the domain from the capability values that will occur to those of skill in the art.

The SOA governance maturity evaluation system (108) of FIG. 1 is also capable of determining, in dependence upon the desired capability values for each of the SOA governance capabilities, a desired domain maturity value for each domain. A desired domain maturity value is a single value representing the desired future maturity of the governance of the domain. Such a value may be determined by averaging the desired capability values for each domain, using a weighted average of the desired capability values, using a predetermined formula other than an average of the desired capability values, taking the median average of the desired capability values, or any other way of determining a single value representing the desired future maturity of the domain from the desired capability values that will occur to those of skill in the art.

The SOA governance maturity evaluation system (108) of FIG. 1 is also capable of determining, in dependence upon the domain maturity values for each domain (112, 114, 116, 118) an SOA governance maturity value (222). An SOA governance maturity value is a single value representing the maturity of the SOA governance. Such a value may be determined by averaging the domain maturity values, using a weighted average of the domain maturity values, using a predetermined formula other than an average of the domain maturity values, taking the median average of the domain maturity values, or any other way of determining a single value representing the maturity of the governance of the SOA from the domain maturity that will occur to those of skill in the art.

The SOA governance maturity evaluation system (108) of FIG. 1 is also capable of determining, in dependence upon the desired domain maturity values for each domain, a desired SOA governance maturity value A desired SOA governance maturity value is a single value representing the desired future maturity of the SOA governance. Such a value may be determined by averaging the desired domain maturity values, using a weighted average of the desired domain maturity values, using a predetermined formula other than an average of the desired domain maturity values, taking the median average of the desired domain maturity values, or any other way of determining a single value representing the desired maturity of the governance of the SOA from the desired domain maturity that will occur to those of skill in the art.

The SOA governance maturity evaluation system (108) of FIG. 1 is also capable of communicating the domain maturity value (216), the SOA maturity value (222), the desired domain maturity value (314), and the desired SOA maturity value (320) to the predetermined stakeholders (106) of the SOA. In the example of FIG. 1 the SOA governance maturity evaluation system (108) is capable of creating a report (120) that includes the domain maturity value (216), the SOA maturity value (222), the desired domain maturity value (314), and the desired SOA maturity value (320) and describing recommendations (128) for the SOA in dependence upon domain maturity value (216), the SOA maturity value (222), the desired domain maturity value (314), and the desired SOA maturity value (320) to the predetermined stakeholders (106) of the SOA. Such recommendations may be retrieved automatically from a database in dependence upon domain the maturity value (216), the SOA maturity value (222), the desired domain maturity value (314), and the desired SOA maturity value (320) to the predetermined stakeholders (106) of the SOA for later edit by a user or created dynamically in dependence upon domain maturity value (216), the SOA maturity value (222), the desired domain maturity value (314), and the desired SOA maturity value (320) to the predetermined stakeholders (106) of the SOA as will occur to those of skill in the art. In the example of FIG. 1 the report (120) may be created automatically using a template for the report. In the example of FIG. 1 the report also includes graphs (130) provided for further explanations of the domain maturity value (216), the SOA maturity value (222), the desired domain maturity value (314), and the desired SOA maturity value (320) to the predetermined stakeholders (106) of the SOA and the resulting recommendations (128).

Having evaluated the maturity of the governance of an SOA it is useful to augment the maturity of the governance of that SOA. The example of FIG. 1 therefore also includes an SOA governance maturity augmentation system (150) capable of augmenting SOA governance maturity according to embodiments of the present invention. The SOA governance maturity augmentation system (150) of FIG. 1 is capable of receiving an evaluation of the maturity of the governance of the SOA. In the example of FIG. 1 the evaluation of the maturity of the governance of the SOA is implemented as an SOA Governance Maturity Assessment Report. In the example of FIG. 1 the evaluation of the maturity of the governance of the SOA (1020) includes a plurality of evaluations (506) of the maturity of a plurality of individual governance capabilities. As mentioned above, SOA governance capabilities are the governance practices of granular aspects of the SOA and such evaluations may be represented as numeric values, symbolic values, alphabetical values, alphanumeric values, or any other manner of implementing a value that will occur to those of skill in the art.

The SOA governance maturity augmentation system (150) of FIG. 1 is capable of identifying, for each governance capability in dependence upon the evaluation of the maturity of the governance capability, one or more predefined risks to the SOA. A predefined risk to the SOA is an issue detrimental to an SOA that has previously been previously associated with SOAs having similar evaluations of maturity in that particular capability. Examples of such predefined risks include:

Lack of data sharing across business operating units
    Inability to manage projects across business operating units
    Inconsistent or non-existent controls for developing SOA services
    Lack of reusable assets
    Lack of clear business goals
    SOA infrastructure not present in IT plan
    Lack of clear roles and responsibilities of SOA stakeholders;
    Poor relationship among IT and business units
    Risks of particular management decisions
    And many others as will occur to those of skill in the art.

These exemplary predefined risks are for explanation and not for limitation. In fact, many such risks may be associated with SOA governance and all such predefined risks may be used in accordance with the present invention.

Identifying, for each governance capability in dependence upon the evaluation of the maturity of the governance capability, one or more predefined risks to the SOA may be carried out by retrieving from a database one or more identifications of predefined risks in dependence upon the value of the evaluation of the maturity of the governance capability.

The SOA governance maturity augmentation system (150) of FIG. 1 is capable of establishing, for each governance capability in dependence upon the predefined risks to the SOA, a risk value representing the severity of the predefined risks. A risk value may be represented as descriptive words, numeric values, symbolic values, alphabetical values, alphanumeric values, or any other manner of implementing a value that will occur to those of skill in the art. Examples of risk values include 'high,' 'low,' 'very high,' 'mild,' 'extreme,' '1,' '5,' 'A,' and many others as will occur to those skill in the art.

Establishing, for each governance capability in dependence upon the predefined risks to the SOA, a risk value representing the severity of the predefined risks may be carried out by selecting from a database one or more identifications of risk values in dependence upon identifications of the predefined risks and often using a predefined selection rule.

The SOA governance maturity augmentation system (150) of FIG. 1 is capable of selecting, for each governance capability in dependence upon the evaluation of the maturity of the governance of the SOA and the predefined risk value, one or more governance work products. A governance work product is an identification of a plan, policy change, and or adoption of a standard for improving the maturity of an SOA governance capability. Examples of governance work products include:

A plan to adopt architectural standards
A plan to adopt one or more design patterns
A policy of monitoring business agility
A plan to improve business flexibility
A plan to reprioritize business goals
A plan to reprioritize financial goals
The adoption of new business terms And many others as will occur to those of skill in the art. These exemplary governance work products are for explanation and not for limitation. In fact, many such governance work products may be useful in augmenting SOA governance maturity in accordance with the present invention and all such governance work products may be used in accordance with the present invention.

Selecting, for each governance capability in dependence upon the evaluation of the maturity of the governance of the SOA and the predefined risk value, one or more governance work products may be carried out by retrieving from a database one or more identifications of work products in dependence upon a selection rule that includes the evaluation of the maturity of the governance of the SOA and a predefined risk value.

The SOA governance maturity augmentation system (150) of FIG. 1 is capable of assigning, for each governance capability, a cost value for carrying out the selected governance work products. A cost value represents a degree of estimated cost of carrying out the governance work products for a governance capability. A cost value may be represented as a descriptive term, numeric values, symbolic values, alphabetical values, alphanumeric values, or any other manner of implementing a cost value that will occur to those of skill in the art. Examples of such cost values include 'high,' 'medium,' '1,' 'A,' and many others as will occur to those of skill in the art.

Assigning, for each governance capability, a cost value for carrying out the selected governance work products may be carried out through the use of cost estimation rule that assigns estimates of costs using previously measured costs for similar or the same work products.

The SOA governance maturity augmentation system (150) of FIG. 1 is capable of communicating to predetermined stakeholders in the SOA the one or more predefined risks to the SOA identified for each governance capability, the risk value established for each governance capability, the governance work products selected for each governance capability, and the cost value assigned for carrying out the selected governance work products for each governance capability. Communicating to predetermined stakeholders in the SOA the one or more predefined risks to the SOA identified for each governance capability, the risk value established for each governance capability, the governance work products selected for each governance capability, and the cost value assigned for carrying out the selected governance work products for each governance capability may be carried out by dynamically creating a report including the predefined risks, the risk values, the governance work products, and the cost values and transmitting the report to the predetermined stakeholders. In the example of FIG. 1 the report (152) may be created automatically using predefined templates.

The SOA governance maturity augmentation system (150) of FIG. 1 is capable of augmenting SOA governance maturity for domains. As mentioned above, a domain of SOA governance is a broader description of related SOA governance capabilities. In the example of FIG. 1, the SOA governance maturity assessment report (120) includes a plurality of evaluations (216) of the maturity of a plurality of governance domains.

The SOA governance maturity augmentation system (150) of FIG. 1 is also capable of identifying, for each governance domain in dependence upon the evaluation of the maturity of the governance domain, one or more predefined risks to the SOA. A predefined risk for a domain is similar to that of a predefined risk for a capability but is oriented to more generalized problems with the SOA. That is risks for a domain are broader and typically are described with less particularity than the specific risks to a capability. Identifying, for each governance domain in dependence upon the evaluation of the maturity of the governance domain, one or more predefined risks to the SOA may be carried out by retrieving from a database one or more identifications of predefined risks in dependence upon the value of the evaluation of the maturity of the governance domain.

The SOA governance maturity augmentation system (150) of FIG. 1 is also capable of establishing, for each governance domain in dependence upon the predefined risks to the SOA, a risk value representing the severity of the predefined risks. A risk value for a domain may be represented as descriptive words, numeric values, symbolic values, alphabetical values, alphanumeric values, or any other manner of implementing a value that will occur to those of skill in the art. Examples of risk values for domains include 'high,' 'low,' 'very high,' 'mild,' 'extreme,' '1,' '5,' 'A,' and many others as will occur to those skill in the art.

Establishing, for each governance domain in dependence upon the predefined risks to the SOA, a risk value representing the severity of the predefined risks may be carried out by selecting from a database one or more identifications of risk values in dependence upon identifications of the predefined risks and often using a predefined selection rule for domains.

The SOA governance maturity augmentation system (150) of FIG. 1 is also capable of selecting, for each governance domain in dependence upon the evaluation of the maturity of the governance of the SOA and the predefined risk value, one or more governance work products. A governance work product for a domain is an identification of a plan, policy change, and or adoption of a standard for improving the maturity of the domain of SOA governance. Such work products typically are designed to improve the maturity of more than one governance capability.

Selecting, for each governance domain in dependence upon the evaluation of the maturity of the governance of the SOA and the predefined risk value, one or more governance work products may be carried out by retrieving from a database one or more identifications of work products in dependence upon a selection rule that includes the evaluation of the maturity of the governance of the SOA and a predefined risk value for the domain.

The SOA governance maturity augmentation system (150) of FIG. 1 is also capable of assigning, for each governance domain, a cost value for carrying out the selected governance work products. A cost value for a domain represents a degree of estimated cost of carrying out the governance work products for a domain. A cost value may be represented as a descriptive term, numeric values, symbolic values, alphabetical values, alphanumeric values, or any other manner of implementing a cost value that will occur to those of skill in the art. Examples of such cost values include 'high,' 'medium,' '1,' 'A,' and many others as will occur to those of skill in the art.

Assigning, for each governance domain, a cost value for carrying out the selected governance work products may be carried out through the use of cost estimation rule that assigns estimates of costs using previously measured costs for similar or the same work products.

The SOA governance maturity augmentation system (150) of FIG. 1 is also capable of communicating to predetermined stakeholders in the SOA the cost value assigned for carrying out the selected governance work products for each governance domain. Communicating to predetermined stakeholders in the SOA the one or more predefined risks to the SOA identified for each governance domain, the risk value established for each governance domain, the governance work products selected for each governance domain, and the cost value assigned for carrying out the selected governance work products for each governance domain may be carried out by dynamically creating a report including the predefined risks, the risk values, the governance work products, and the cost values and transmitting the report to the predetermined stakeholders. In the example of FIG. 1 the report (152) may be created automatically using predefined templates.

Data processing systems useful in evaluating service oriented architecture ('SOA') governance maturity according to various embodiments of the present invention may include computers, servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Evaluating SOA governance maturity in accordance with the present invention is generally implemented with computers, that is, with automated computing machinery. For further explanation, therefore, FIG. 2 sets forth a block diagram of automated computing machinery comprising an exemplary computer (152) useful in evaluating SOA maturity according to embodiments of the present invention and augmenting SOA governance maturity in accordance with the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a SOA governance maturity evaluation module (400), a module of computer program instructions for evaluating SOA governance maturity. The SOA governance maturity evaluation module (400) is capable of receiving, from a plurality of predetermined stakeholders in the SOA for a plurality of SOA governance capabilities, a stakeholder assessed value representing the current maturity of each of the plurality of SOA governance capabilities; determining, for each of the plurality of SOA governance capabilities in dependence upon the plurality of stakeholder assessed values from the stakeholders, a capability value for each of the plurality of SOA governance capabilities; assigning each of the SOA governance capabilities to a domain; determining, in dependence upon the capability values for each of the plurality of SOA governance capabilities of each domain, a domain maturity value for each domain; and communicating the domain maturity value for each domain to the predetermined stakeholders of the SOA by creating a report describing recommendations for the SOA in dependence upon the domain maturity value and transmitting the report to the predetermined stakeholders.

The SOA governance maturity evaluation module (400) is also capable of determining, in dependence upon the domain maturity values for each domain an SOA governance maturity value and communicating the SOA governance maturity value to the predetermined stakeholders of the SOA by creating a report describing recommendations for SOA governance in dependence upon the current SOA maturity and transmitting the report to the predetermined stakeholders.

Figure 2:
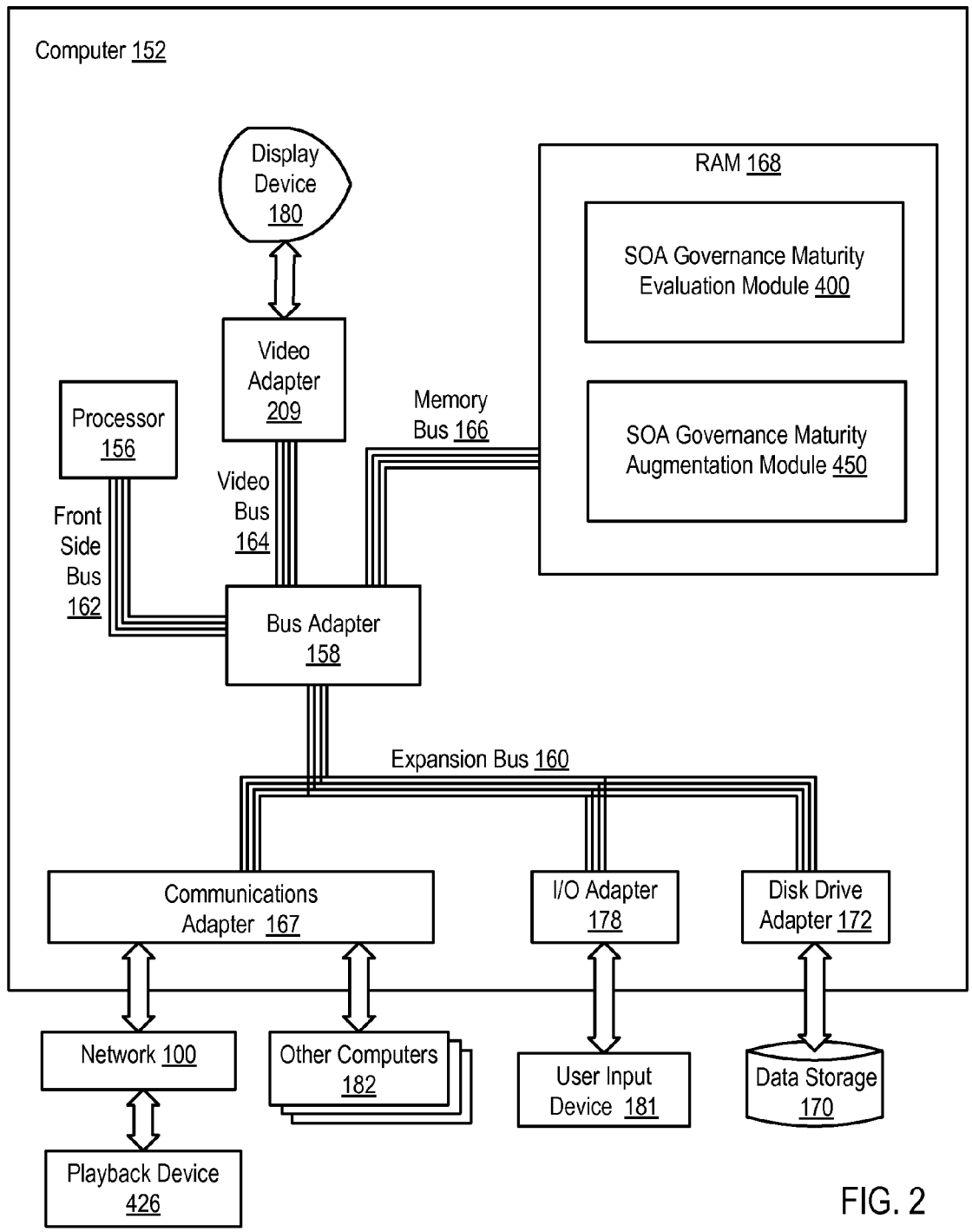
FIG. 2 sets forth a block diagram of automated computing machinery comprising an exemplary computer useful in evaluating SOA maturity according to embodiments of the present invention and augmenting SOA governance maturity in accordance with the present invention.

The SOA governance maturity evaluation module (400) of FIG. 2 is also capable of receiving, from the plurality of predetermined stakeholders in the SOA for a plurality of SOA governance capabilities, a desired stakeholder maturity value representing a desired maturity of each of the plurality of SOA governance capabilities; determining, for each of the SOA governance capabilities in dependence upon the plurality of desired stakeholder maturity values, a desired capability value for each of the SOA governance capabilities; determining, in dependence upon the desired capability values for each of the SOA governance capabilities, a desired domain maturity value for each domain; and communicating the desired domain maturity value for each domain to the predetermined stakeholders of the SOA by creating a report describing the recommendations for SOA governance in dependence upon the current maturity of each domain of the SOA and describing recommendations for SOA governance in dependence upon the desired maturity of each domain and transmitting the report to the predetermined stakeholders.

The SOA governance maturity evaluation module (400) of FIG. 2 is capable of determining, in dependence upon the desired domain maturity values for each domain, a desired SOA governance maturity value and communicating the desired SOA governance maturity value to the predetermined stakeholders of the SOA by creating a report describing recommendations for SOA governance in dependence upon the current SOA maturity and describing recommendations for SOA governance in dependence upon the desired SOA maturity and transmitting the report to the predetermined stakeholders.

Stored in RAM (168) is a SOA governance maturity augmentation module (450), a module of computer program instructions for augmenting SOA governance maturity according to the present invention. The SOA governance maturity augmentation module (450) of FIG. 2 is capable of receiving an evaluation of the maturity of the governance of the SOA; identifying, for each governance capability in dependence upon the evaluation of the maturity of the governance capability, one or more predefined risks to the SOA; establishing, for each governance capability in dependence upon the predefined risks to the SOA, a risk value representing the severity of the predefined risks; selecting, for each governance capability in dependence upon the evaluation of the maturity of the governance of the SOA and the predefined risk value, one or more governance work products; and communicating to predetermined stakeholders in the SOA the one or more predefined risks to the SOA identified for each governance capability, the risk value established for each governance capability, and the governance work products selected for each governance capability.

The SOA governance maturity augmentation module (450) of FIG. 2 is capable of assigning, for each governance capability, a cost value for carrying out the selected governance work products and communicating to predetermined stakeholders in the SOA the cost value assigned for carrying out the selected governance work products for each governance capability by dynamically creating a report including the predefined risks, the risk values, the governance work products, and the cost values and transmitting the report to the predetermined stakeholders.

The SOA governance maturity augmentation module (450) of FIG. 2 is also capable of receiving an evaluation of the maturity of the governance of the SOA that includes a plurality of evaluations of the maturity of a plurality of governance domains; identifying, for each governance domain in dependence upon the evaluation of the maturity of the governance domain, one or more predefined risks to the SOA; establishing, for each governance domain in dependence upon the predefined risks to the SOA, a risk value representing the severity of the predefined risks; selecting, for each governance domain in dependence upon the evaluation of the maturity of the governance of the SOA and the predefined risk value, one or more governance work products; and communicating to predetermined stakeholders in the SOA the one or more predefined risks to the SOA identified for each governance domain, the risk value established for each governance domain, and the governance work products selected for each governance domain.

The SOA governance maturity augmentation module (450) of FIG. 2 is also capable of assigning, for each governance domain, a cost value for carrying out the selected governance work products; and communicating to predetermined stakeholders in the SOA the cost value assigned for carrying out the selected governance work products for each governance domain by dynamically creating a report including the predefined risks, the risk values, the governance work products, and the cost values and transmitting the report to the predetermined stakeholders.

Also stored in RAM (168) is an operating system (154). An operating system is a computer software component that is responsible for execution of applications programs and for administration of access to computer resources, memory, processor time, and I/O functions, on behalf of application programs. Operating systems useful evaluating SOA governance maturity and augmenting SOA governance maturity according to embodiments of the present invention include UNIX™, Linux™, Microsoft XP™, AIX™, IBM's i5/OS™, and others as will occur to those of skill in the art. The operating system (154), the SOA governance maturity evaluation module (400) and SOA governance maturity augmentation module (450) in the example of FIG. 2 are shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for evaluating SOA governance maturity and augmenting SOA governance maturity according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for evaluating SOA governance maturity and augmenting SOA governance maturity according to embodiments of the present invention include modems for wired dial-up communications, Ethernet™ (IEEE 802.3) adapters for wired data communications network communications, and 802.11 adapters for wireless data communications network communications.

Exemplary embodiments of the present invention are described largely in the context of a fully functional system for evaluating service oriented architecture ('SOA') governance maturity and augmenting SOA governance maturity. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

Evaluating Service Oriented Architecture ('SOA') Governance Maturity

Figure 3:
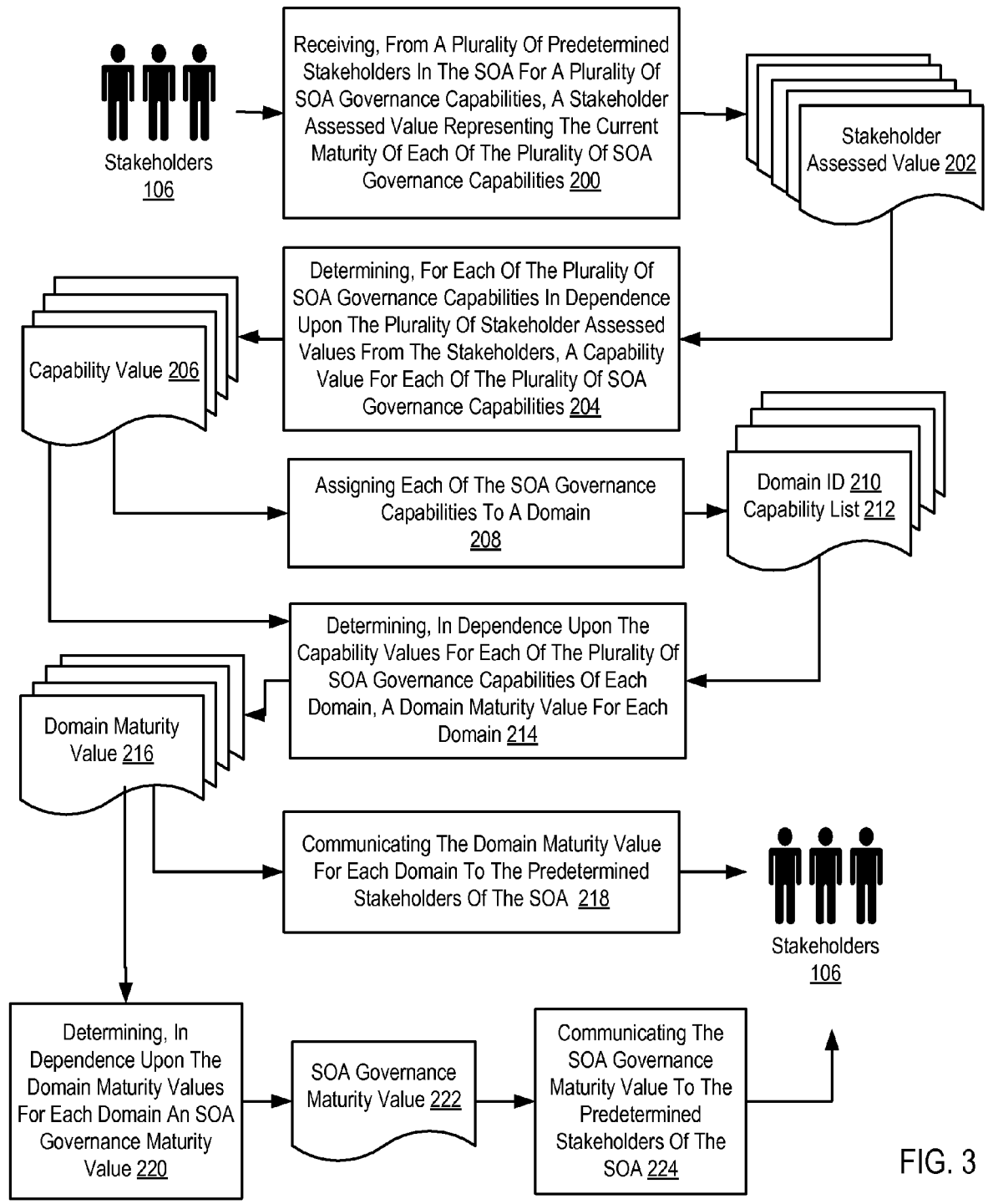
FIG. 3 sets forth a flow chart illustrating an exemplary method for evaluating service oriented architecture ('SOA') governance maturity according to embodiments of the present invention.

For further explanation, FIG. 3 sets forth a flow chart illustrating an exemplary method for evaluating service oriented architecture ('SOA') governance maturity according to embodiments of the present invention. The method of FIG. 3 includes receiving (200), from a plurality of predetermined stakeholders (106) in the SOA for a plurality of SOA governance capabilities, a stakeholder assessed value (202) representing the current maturity of each of the plurality of SOA governance capabilities. As mentioned above, a predetermined stakeholder (106) refers to stakeholders that have been selected to provide information regarding the maturity of the governance of the SOA and SOA governance capabilities are the governance practices of granular aspects of the SOA, and a stakeholder assessed value representing the current maturity of each of the plurality of SOA governance capabilities according to the present invention is a value provided by each of the predetermined stakeholders representing the current maturity of that SOA governance capability.

The method of FIG. 3 includes determining (204), for each of the plurality of SOA governance capabilities in dependence upon the plurality of stakeholder assessed values (202) from the stakeholders (106), a capability value (206) for each of the plurality of SOA governance capabilities. As mentioned above, a capability value is a single value representing the maturity of the SOA governance capability. Determining (204), for each of the plurality of SOA governance capabilities in dependence upon the plurality of stakeholder assessed values (202) from the stakeholders, a capability value (206) for each of the plurality of SOA governance capabilities may be carried out by averaging the stakeholder assessed values, using a weighted average of the stakeholder assessed values, using a predetermined formula other than an average, taking the median average, or any other way of determining a single value representing the maturity of the SOA capability from the stakeholder assessed capabilities that will occur to those of skill in the art.

The method of FIG. 3 also includes assigning (208) each of the SOA governance capabilities to a domain. In the example of FIG. 3 a domain ID (210) identifying a particular domain has assigned to it one or more capabilities included in a capability list (212). As mentioned above, domain of SOA governance is a broader description of related SOA governance capabilities.

The method of FIG. 3 includes determining (214), in dependence upon the capability values (206) for each of the plurality of SOA governance capabilities of each domain, a domain maturity value (216) for each domain. As mentioned above, a domain maturity value is a single value representing the maturity of the governance of the domain. Determining, in dependence upon the capability values for each of the plurality of SOA governance capabilities of each domain, a domain maturity value (216) for each domain may be carried out by averaging the capability values for each domain, using a weighted average of the capability values, using a predetermined formula other than an average of the capability values, taking the median average of the capability values, or any other way of determining a single value representing the maturity of the domain from the capability values that will occur to those of skill in the art.

The method of FIG. 3 includes communicating (218) the domain maturity value (216) for each domain to the predetermined stakeholders (106) of the SOA. Communicating (218) the domain maturity value for each domain to the predetermined stakeholders of the SOA may be carried out by creating a report describing recommendations for the SOA in dependence upon the domain maturity value and transmitting the report to the predetermined stakeholders.

The method of FIG. 3 also includes determining (220), in dependence upon the domain maturity values (216) for each domain an SOA governance maturity value (222). As mentioned above, an SOA governance maturity value is a single value representing the maturity of the SOA governance. Determining (220), in dependence upon the domain maturity values (216) for each domain an SOA governance maturity value (222) may be carried out by averaging the domain maturity values, using a weighted average of the domain maturity values, using a predetermined formula other than an average of the domain maturity values, taking the median average of the domain maturity values, or any other way of determining a single value representing the maturity of the governance of the SOA from the domain maturity that will occur to those of skill in the art.

The method of FIG. 3 also includes communicating (224) the SOA governance maturity value to the predetermined stakeholders (106) of the SOA. Communicating (224) the SOA governance maturity value (222) to the predetermined stakeholders (106) of the SOA may be carried out by creating a report describing recommendations for SOA governance in dependence upon the SOA governance maturity value (222) and transmitting the report to the predetermined stakeholders (106).

As mentioned above, stakeholders may provide values representing desired maturity of SOA capabilities for use in some embodiments of evaluating SOA maturity that determines desired capability values, desired domain maturity values and desired SOA maturity values. For further explanation, FIG. 4 sets forth a flow chart illustrating additional steps used in some additional embodiments of evaluating service oriented architecture ('SOA') governance maturity according to the present invention. The method of FIG. 4 includes receiving (302), from the plurality of predetermined stakeholders (106) in the SOA for a plurality of SOA governance capabilities, a desired stakeholder maturity value (304) representing a desired maturity of each of the plurality of SOA governance capabilities. A desired capability value is a single value representing the desired future maturity of the SOA governance capability.

Figure 4:
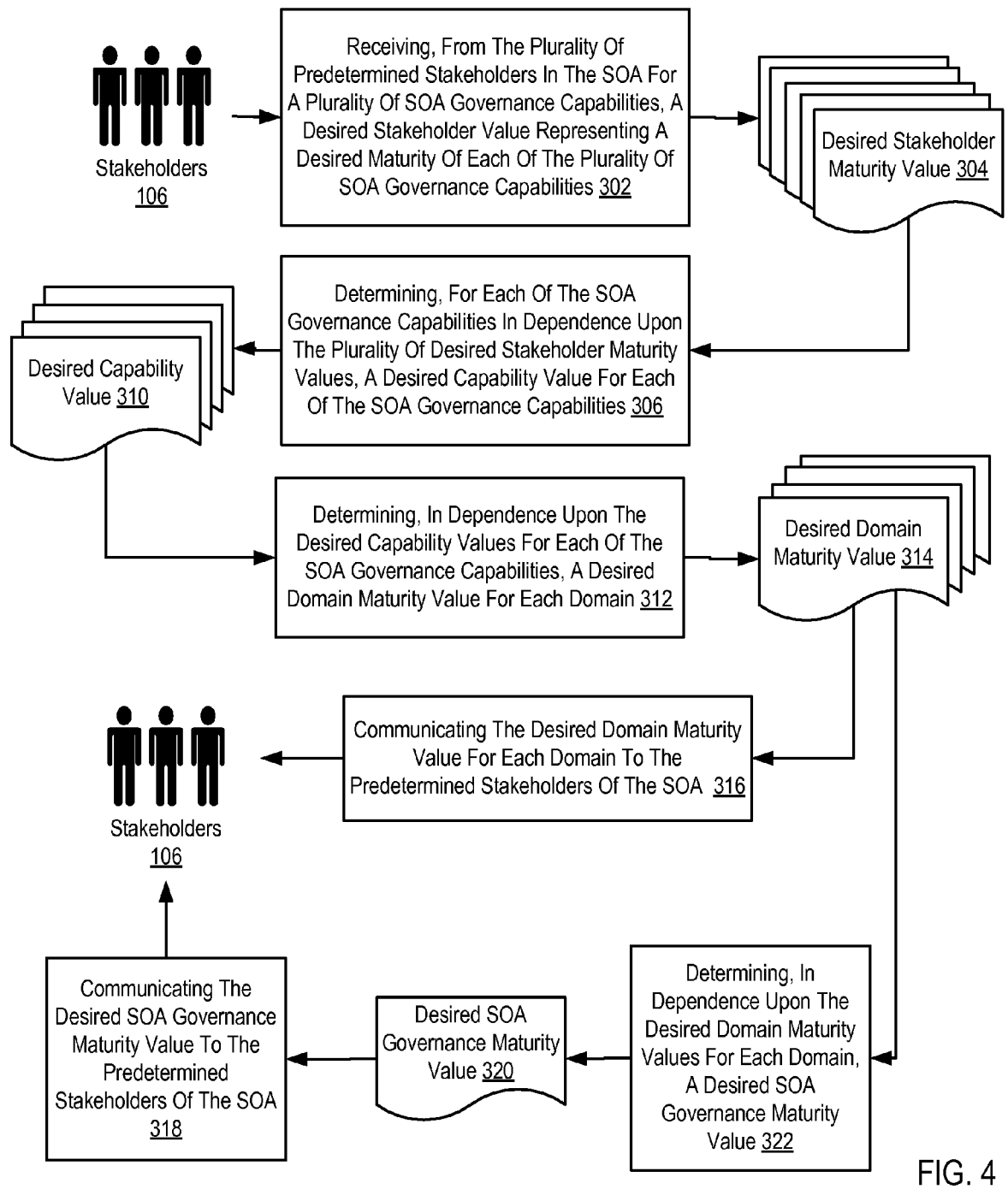
FIG. 4 sets forth a flow chart illustrating additional steps used in some additional embodiments of evaluating service oriented architecture ('SOA') governance maturity according to the present invention.

The method of FIG. 4 also includes determining (306), for each of the SOA governance capabilities in dependence upon the plurality of desired stakeholder maturity values (304), a desired capability value (310) for each of the SOA governance capabilities. A desired capability value is a single value representing the desired future maturity of the SOA governance capability. Determining (306), for each of the SOA governance capabilities in dependence upon the plurality of desired stakeholder maturity values (304), a desired capability value (310) for each of the SOA governance capabilities may be carried out by averaging the desired stakeholder maturity values, using a weighted average of the desired stakeholder maturity values, using a predetermined formula other than an average, taking the median average, or any other way of determining a single value representing the desired maturity of the SOA capability from the desired stakeholder maturity values that will occur to those of skill in the art.

The method of FIG. 4 also includes determining (312), in dependence upon the desired capability values (310) for each of the SOA governance capabilities, a desired domain maturity value (314) for each domain. A desired domain maturity value is a single value representing the desired future maturity of the governance of the domain. Determining (312), in dependence upon the desired capability values (310) for each of the SOA governance capabilities, a desired domain maturity value (314) for each domain may be carried out by averaging the desired capability values for each domain, using a weighted average of the desired capability values, using a predetermined formula other than an average of the desired capability values, taking the median average of the desired capability values, or any other way of determining a single value representing the desired future maturity of the domain from the desired capability values that will occur to those of skill in the art.

The method of FIG. 4 also includes communicating (316) the desired domain maturity value (314) for each domain to the predetermined stakeholders (106) of the SOA. Communicating (316) the desired domain maturity value (314) for each domain to the predetermined stakeholders of the SOA may be carried out by creating a report describing recommendations for SOA governance in dependence upon the current maturity of each domain of the SOA and describing recommendations for SOA governance in dependence upon the desired maturity value (314) of each domain and transmitting the report to the predetermined stakeholders (106).

The method of FIG. 4 also includes determining (322), in dependence upon the desired domain maturity values (314) for each domain, a desired SOA governance maturity value (318) and communicating the desired SOA governance maturity value (320) to the predetermined stakeholders of the SOA. A desired SOA governance maturity value is a single value representing the desired future maturity of the SOA governance. Determining (322), in dependence upon the desired domain maturity values (314) for each domain, a desired SOA governance maturity value (318) may be carried out by averaging the desired domain maturity values, using a weighted average of the desired domain maturity values, using a predetermined formula other than an average of the desired domain maturity values, taking the median average of the desired domain maturity values, or any other way of determining a single value representing the desired maturity of the governance of the SOA from the desired domain maturity that will occur to those of skill in the art. Communicating the desired SOA governance maturity value (322) to the predetermined stakeholders of the SOA further comprises creating a report describing recommendations for SOA governance in dependence upon the current SOA maturity value and describing recommendations for SOA governance in dependence upon the desired SOA maturity value and transmitting the report to the predetermined stakeholders.

Augmenting Service Oriented Architecture ('SOA') Governance Maturity

Figure 5:
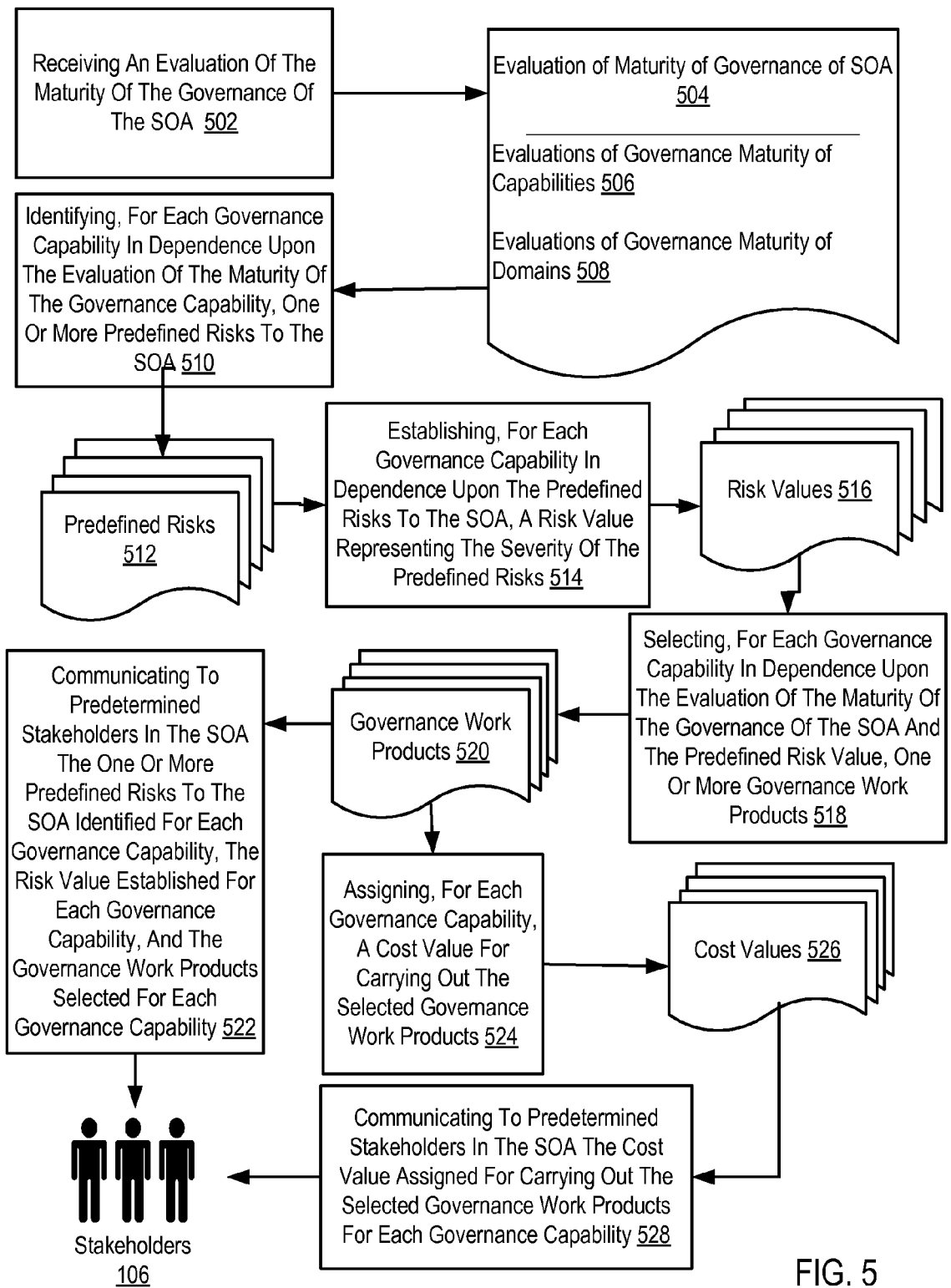
FIG. 5 sets forth a flow chart illustrating an exemplary method of augmenting service oriented architecture ('SOA') governance maturity in accordance with the present invention.

For further explanation, FIG. 5 sets forth a flow chart illustrating an exemplary method of augmenting service oriented architecture ('SOA') governance maturity in accordance with the present invention. The method of FIG. 5 includes receiving (502) an evaluation (504) of the maturity of the governance of the SOA. In the example of FIG. 5 the evaluation of the maturity (504) of the governance of the SOA includes a plurality of evaluations (506) of the maturity of a plurality of governance capabilities.

The method of FIG. 5 also includes identifying (510), for each governance capability in dependence upon the evaluation of the maturity of the governance capability (506), one or more predefined risks (512) to the SOA. Identifying, for each governance capability in dependence upon the evaluation of the maturity of the governance capability, one or more predefined risks to the SOA may be carried out by retrieving from a database one or more identifications of predefined risks in dependence upon the value of the evaluation of the maturity of the governance capability.

The method of FIG. 5 also includes establishing (514), for each governance capability in dependence upon the predefined risks (512) to the SOA, a risk value (516) representing the severity of the predefined risks. Establishing, for each governance capability in dependence upon the predefined risks to the SOA, a risk value representing the severity of the predefined risks may be carried out by selecting from a database one or more identifications of risk values in dependence upon identifications of the predefined risks and often using a predefined selection rule.

The method of FIG. 5 also includes selecting (518), for each governance capability in dependence upon the evaluation of the maturity of the governance of the SOA (514) and the predefined risk value (516), one or more governance work products (520). Selecting, for each governance capability in dependence upon the evaluation of the maturity of the governance of the SOA and the predefined risk value, one or more governance work products may be carried out by retrieving from a database one or more identifications of work products in dependence upon a selection rule that includes the evaluation of the maturity of the governance of the SOA and a predefined risk value.

The method of FIG. 5 also includes communicating (522) to predetermined stakeholders in the SOA the one or more predefined risks (512) to the SOA identified for each governance capability, the risk value (516) established for each governance capability, and the governance work products (520) selected for each governance capability. Communicating to predetermined stakeholders in the SOA the one or more predefined risks to the SOA identified for each governance capability, the risk value established for each governance capability, and the governance work products selected for each governance capability may be carried out by dynamically creating a report including the predefined risks, the risk values, and the governance work products and transmitting the report to the predetermined stakeholders. The report may be created automatically using predefined templates.

The method of FIG. 5 also includes assigning (524), for each governance capability, a cost value (526) for carrying out the selected governance work products. The cost value represents a degree of estimated cost of carrying out the governance work products for an governance capability. Assigning, for each governance capability, a cost value for carrying out the selected governance work products may be carried out through the use of cost estimation rule that assigns estimates of costs using previously measured costs for similar or the same work products.

The method of FIG. 5 also includes communicating (528) to predetermined stakeholders in the SOA the cost value assigned for carrying out the selected governance work products for each governance capability. Communicating to predetermined stakeholders in the SOA the one or more predefined risks to the SOA identified for each governance capability, the risk value established for each governance capability, the governance work products selected for each governance capability, and the cost value assigned for carrying out the selected governance work products for each governance capability may be carried out by dynamically creating a report including the predefined risks, the risk values, the governance work products, and the cost values and transmitting the report to the predetermined stakeholders. The report may be created automatically using predefined templates.

Figure 6:
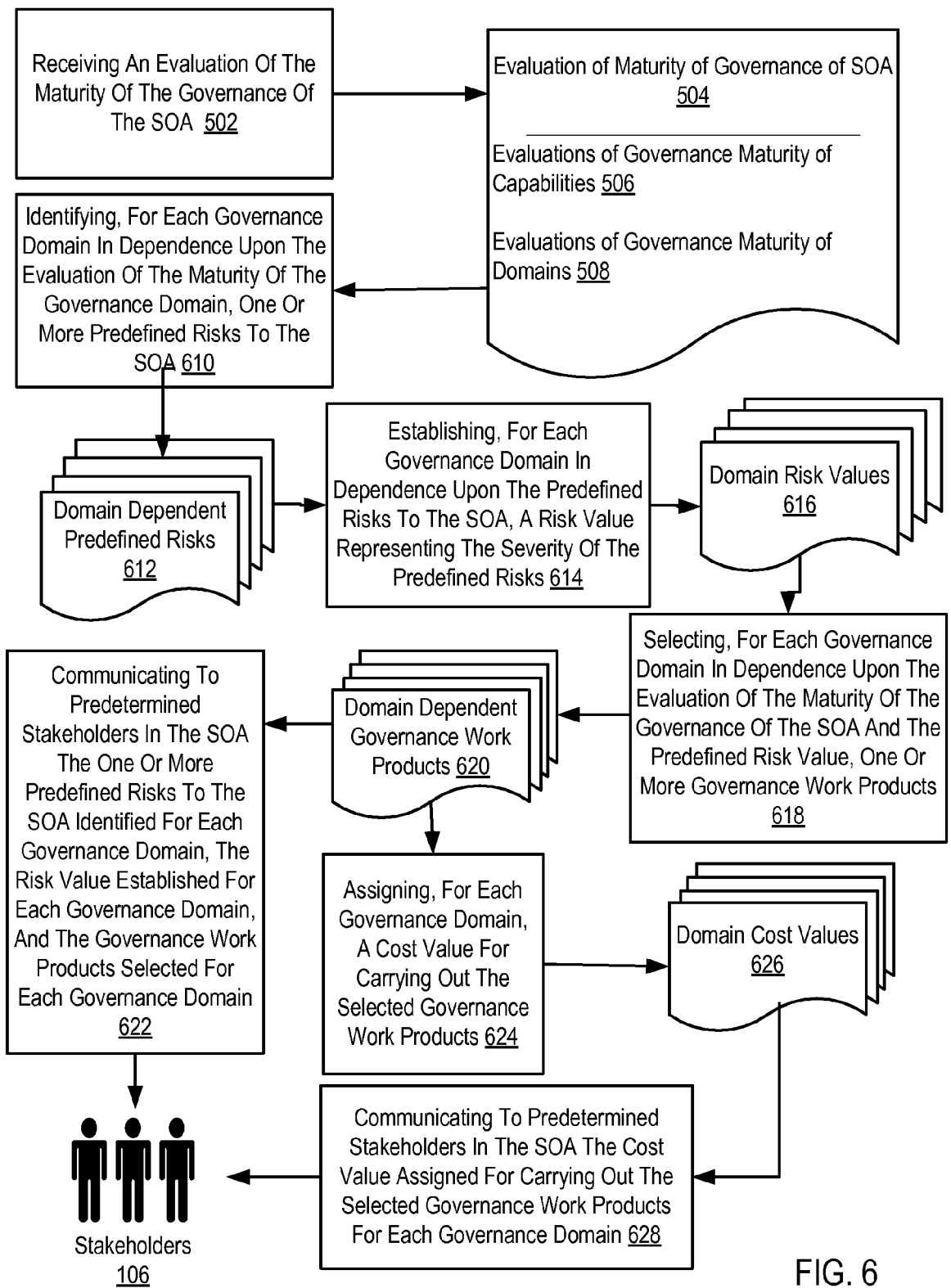
FIG. 6 sets forth a flow char illustrating additional steps for augmenting service oriented architecture ('SOA') governance maturity in accordance with additional embodiments of the present invention.

As mentioned above, augmenting SOA governance maturity according to the present invention is capable of augmenting SOA governance maturity for domains. For further explanation, FIG. 6 sets forth a flow char illustrating additional steps for augmenting service oriented architecture ('SOA') governance maturity in accordance with additional embodiments of the present invention. In the example of FIG. 6, the evaluation (504) of the maturity of the governance of the SOA includes a plurality of evaluations (508) of the maturity of a plurality of governance domains.

The method of FIG. 6 includes identifying (610), for each governance domain in dependence upon the evaluation (508) of the maturity of the governance domain, one or more predefined risks (612) to the SOA. Identifying, for each governance domain in dependence upon the evaluation of the maturity of the governance domain, one or more predefined risks to the SOA may be carried out by retrieving from a database one or more identifications of predefined risks in dependence upon the value of the evaluation of the maturity of the governance domain.

The method of FIG. 6 also includes establishing (614), for each governance domain in dependence upon the predefined risks (612) to the SOA, a risk value (616) representing the severity of the predefined risks. Establishing, for each governance domain in dependence upon the predefined risks to the SOA, a risk value representing the severity of the predefined risks may be carried out by selecting from a database one or more identifications of risk values in dependence upon identifications of the predefined risks and often using a predefined selection rule for domains.

The method of FIG. 6 also includes selecting (618), for each governance domain in dependence upon the evaluation of the maturity of the governance of the SOA and the predefined risk value (616), one or more governance work products (620). Selecting, for each governance domain in dependence upon the evaluation of the maturity of the governance of the SOA and the predefined risk value, one or more governance work products may be carried out by retrieving from a database one or more identifications of work products in dependence upon a selection rule that includes the evaluation of the maturity of the governance of the SOA and a predefined risk value for the domain.

The method of FIG. 6 also includes communicating (622) to predetermined stakeholders in the SOA the one or more predefined risks to the SOA identified for each governance domain (612), the risk value (616) established for each governance domain, and the governance work products (620) selected for each governance domain. Communicating to predetermined stakeholders in the SOA the one or more predefined risks to the SOA identified for each governance domain, the risk value established for each governance domain, and the governance work products selected for each governance domain may be carried out by dynamically creating a report including the predefined risks, the risk values, and the governance work products and transmitting the report to the predetermined stakeholders. The report (152) may be created automatically using predefined templates.

The method of FIG. 6 also includes assigning (624), for each governance domain, a cost value (626) for carrying out the selected governance work products (620). The cost value represents a degree of estimated cost of carrying out the governance work products for an governance domain. Assigning, for each governance domain, a cost value for carrying out the selected governance work products may be carried out through the use of cost estimation rule that assigns estimates of costs using previously measured costs for similar or the same work products.

The method of FIG. 6 also includes communicating (628) to predetermined stakeholders in the SOA the cost value (626) assigned for carrying out the selected governance work products for each governance domain. Communicating to predetermined stakeholders in the SOA the one or more predefined risks to the SOA identified for each governance domain, the risk value established for each governance domain, the governance work products selected for each governance domain, and the cost value assigned for carrying out the selected governance work products for each governance domain may be carried out by dynamically creating a report including the predefined risks, the risk values, the governance work products, and the cost values and transmitting the report to the predetermined stakeholders. The report (152) may be created automatically using predefined templates.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of augmenting service oriented architecture ('SOA') governance maturity, the method comprising:

receiving, by one or more modules of automated computing machinery in an SOA governance maturity augmentation system, an evaluation of the maturity of the governance of the SOA wherein the maturity of the governance of the SOA represents an indication of the degree of development, experience, and reliability of the governance of the SOA;

wherein the evaluation of the maturity of the governance of the SOA includes a plurality of evaluations of the maturity of a plurality of governance capabilities;

identifying, by one or more modules of automated computing machinery in the SOA governance maturity augmentation system, for each governance capability in dependence upon the evaluation of the maturity of the governance capability, one or more predefined risks to the SOA;

establishing, by one or more modules of automated computing machinery in the SOA governance maturity augmentation system, for each governance capability in dependence upon the predefined risks to the SOA, a risk value representing the severity of the predefined risks;

selecting, by one or more modules of automated computing machinery in the SOA governance maturity augmentation system, for each governance capability in dependence upon the evaluation of the maturity of the governance of the SOA and the predefined risk value, one or more governance work products;

communicating, by one or more modules of automated computing machinery in the SOA governance maturity augmentation system, to predetermined stakeholders in the SOA the one or more predefined risks to the SOA identified for each governance capability, the risk value established for each governance capability, and the governance work products selected for each governance capability.

2. The method of claim 1 further comprising:
assigning, by one or more modules of automated computing machinery in the SOA governance maturity augmentation system, for each governance capability, a cost value for carrying out the selected governance work products;
wherein the cost value represents a degree of estimated cost of carrying out the governance work products for an governance capability; and
communicating, by one or more modules of automated computing machinery in the SOA governance maturity augmentation system, to predetermined stakeholders in the SOA the cost value assigned for carrying out the selected governance work products for each governance capability.

3. The method of claim 2 wherein communicating, by one or more modules of automated computing machinery in the SOA governance maturity augmentation system, to predetermined stakeholders in the SOA the one or more predefined risks to the SOA identified for each governance capability, the risk value established for each governance capability, the governance work products selected for each governance capability, and the cost value assigned for carrying out the selected governance work products for each governance capability further comprises dynamically creating, by one or more modules of automated computing machinery in the SOA governance maturity augmentation system, a report including the predefined risks, the risk values, the governance work products, and the cost values and transmitting the report to the predetermined stakeholders.

4. The method of claim 1 wherein the evaluation of the maturity of the governance of the SOA includes a plurality of evaluations of the maturity of a plurality of governance domains and wherein the method further comprises:
identifying, by one or more modules of automated computing machinery in the SOA governance maturity augmentation system, for each governance domain in dependence upon the evaluation of the maturity of the governance domain, one or more predefined risks to the SOA;
establishing, by one or more modules of automated computing machinery in the SOA governance maturity augmentation system, for each governance domain in dependence upon the predefined risks to the SOA, a risk value representing the severity of the predefined risks;
selecting, by one or more modules of automated computing machinery in the SOA governance maturity augmentation system, for each governance domain in dependence upon the evaluation of the maturity of the governance of the SOA and the predefined risk value, one or more governance work products;
communicating, by one or more modules of automated computing machinery in the SOA governance maturity augmentation system, to predetermined stakeholders in the SOA the one or more predefined risks to the SOA identified for each governance domain, the risk value established for each governance domain, and the governance work products selected for each governance domain.

5. The method of claim 4 further comprising:
assigning, by one or more modules of automated computing machinery in the SOA governance maturity augmentation system, for each governance domain, a cost value for carrying out the selected governance work products;
wherein the cost value represents a degree of estimated cost of carrying out the governance work products for an governance domain; and
communicating, by one or more modules of automated computing machinery in the SOA governance maturity augmentation system, to predetermined stakeholders in the SOA the cost value assigned for carrying out the selected governance work products for each governance domain.

6. The method of claim 5 wherein communicating, by one or more modules of automated computing machinery in the SOA governance maturity augmentation system, to predetermined stakeholders in the SOA the one or more predefined risks to the SOA identified for each governance domain, the risk value established for each governance domain, the governance work products selected for each governance domain, and the cost value assigned for carrying out the selected governance work products for each governance domain further comprises dynamically creating, by one or more modules of automated computing machinery in the SOA governance maturity augmentation system, a report including the predefined risks, the risk values, the governance work products, and the cost values and transmitting the report to the predetermined stakeholders.

7. A system of augmenting service oriented architecture ('SOA') governance maturity, the system comprising a computer processor, a computer memory operatively coupled to the computer processor, the computer memory having disposed within it computer program instructions capable of:
receiving, by one or more modules of automated computing machinery in the system, an evaluation of the maturity of the governance of the SOA wherein the maturity of the governance of the SOA represents an indication of the degree of development, experience, and reliability of the governance of the SOA;
wherein the evaluation of the maturity of the governance of the SOA includes a plurality of evaluations of the maturity of a plurality of governance capabilities;
identifying, by one or more modules of automated computing machinery in the system, for each governance capability in dependence upon the evaluation of the maturity of the governance capability, one or more predefined risks to the SOA;
establishing, by one or more modules of automated computing machinery in the system, for each governance capability in dependence upon the predefined risks to the SOA, a risk value representing the severity of the predefined risks;
selecting, by one or more modules of automated computing machinery in the system, for each governance capability in dependence upon the evaluation of the maturity of the governance of the SOA and the predefined risk value, one or more governance work products;
communicating, by one or more modules of automated computing machinery in the system, to predetermined stakeholders in the SOA the one or more predefined risks to the SOA identified for each governance capability, the risk value established for each governance capability, and the governance work products selected for each governance capability.

8. The system of claim 7 wherein the computer memory has disposed within it computer program instructions capable of:
assigning, by one or more modules of automated computing machinery in the system, for each governance capability, a cost value for carrying out the selected governance work products;
wherein the cost value represents a degree of estimated cost of carrying out the governance work products for an governance capability; and communicating, by one or more modules of automated computing machinery in the system, to predetermined stakeholders in the SOA the cost value assigned for carrying out the selected governance work products for each governance capability.

9. The system of claim 8 wherein computer program instructions capable of communicating, by one or more modules of automated computing machinery in the system, to predetermined stakeholders in the SOA the one or more predefined risks to the SOA identified for each governance capability, the risk value established for each governance capability, the governance work products selected for each governance capability, and the cost value assigned for carrying out the selected governance work products for each governance capability further comprise computer program instructions capable of dynamically creating, by one or more modules of automated computing machinery in the system, a report including the predefined risks, the risk values, the governance work products, and the cost values and transmitting the report to the predetermined stakeholders.

10. The system of claim 7 wherein the evaluation of the maturity of the governance of the SOA includes a plurality of evaluations of the maturity of a plurality of governance domains and wherein the computer memory has disposed within it computer program instructions capable of:
  identifying, by one or more modules of automated computing machinery in the system, for each governance domain in dependence upon the evaluation of the maturity of the governance domain, one or more predefined risks to the SOA;
  establishing, by one or more modules of automated computing machinery in the system, for each governance domain in dependence upon the predefined risks to the SOA, a risk value representing the severity of the predefined risks;
  selecting, by one or more modules of automated computing machinery in the system, for each governance domain in dependence upon the evaluation of the maturity of the governance of the SOA and the predefined risk value, one or more governance work products;
  communicating, by one or more modules of automated computing machinery in the system, to predetermined stakeholders in the SOA the one or more predefined risks to the SOA identified for each governance domain, the risk value established for each governance domain, and the governance work products selected for each governance domain.

11. The system of claim 10 wherein the computer memory has disposed within it computer program instructions capable of:
  assigning, by one or more modules of automated computing machinery in the system, for each governance domain, a cost value for carrying out the selected governance work products;
  wherein the cost value represents a degree of estimated cost of carrying out the governance work products for an governance domain; and
  communicating, by one or more modules of automated computing machinery in the system, to predetermined stakeholders in the SOA the cost value assigned for carrying out the selected governance work products for each governance domain.

12. The system of claim 11 wherein computer program instructions capable of communicating, by one or more modules of automated computing machinery in the system, to predetermined stakeholders in the SOA the one or more predefined risks to the SOA identified for each governance domain, the risk value established for each governance domain, the governance work products selected for each governance domain, and the cost value assigned for carrying out the selected governance work products for each governance domain further comprise computer program instructions capable of dynamically creating, by one or more modules of automated computing machinery in the SOA governance maturity augmentation system, a report including the predefined risks, the risk values, the governance work products, and the cost values and transmitting the report to the predetermined stakeholders.

13. A computer program product of augmenting service oriented architecture ('SOA') governance maturity, the computer program product disposed in a signal bearing medium, the computer program product comprising computer program instructions capable of:
  receiving, by one or more modules of automated computing machinery in an SOA governance maturity augmentation system, an evaluation of the maturity of the governance of the SOA wherein the maturity of the governance of the SOA represents an indication of the degree of development, experience, and reliability of the governance of the SOA;
  wherein the evaluation of the maturity of the governance of the SOA includes a plurality of evaluations of the maturity of a plurality of governance capabilities;
  identifying, by one or more modules of automated computing machinery in the SOA governance maturity augmentation system, for each governance capability in dependence upon the evaluation of the maturity of the governance capability, one or more predefined risks to the SOA;
  establishing, by one or more modules of automated computing machinery in the SOA governance maturity augmentation system, for each governance capability in dependence upon the predefined risks to the SOA, a risk value representing the severity of the predefined risks;
  selecting, by one or more modules of automated computing machinery in the SOA governance maturity augmentation system, for each governance capability in dependence upon the evaluation of the maturity of the governance of the SOA and the predefined risk value, one or more governance work products;
  communicating, by one or more modules of automated computing machinery in the SOA governance maturity augmentation system, to predetermined stakeholders in the SOA the one or more predefined risks to the SOA identified for each governance capability, the risk value established for each governance capability, and the governance work products selected for each governance capability.

14. The computer program product of claim 13 further comprising computer program instructions capable of:
  assigning, by one or more modules of automated computing machinery in the SOA governance maturity augmentation system, for each governance capability, a cost value for carrying out the selected governance work products;
  wherein the cost value represents a degree of estimated cost of carrying out the governance work products for an governance capability; and
  communicating, by one or more modules of automated computing machinery in the SOA governance maturity augmentation system, to predetermined stakeholders in the SOA the cost value assigned for carrying out the selected governance work products for each governance capability.

15. The computer program product of claim 14 wherein computer program instructions capable of communicating, by one or more modules of automated computing machinery in the SOA governance maturity augmentation system, to predetermined stakeholders in the SOA the one or more predefined risks to the SOA identified for each governance capability, the risk value established for each governance capability, the governance work products selected for each governance capability, and the cost value assigned for carrying out the selected governance work products for each governance capability further comprise computer program instructions capable of dynamically creating, by one or more modules of automated computing machinery in the SOA governance maturity augmentation system, a report including the predefined risks, the risk values, the governance work products, and the cost values and transmitting the report to the predetermined stakeholders.

16. The computer program product of claim 13 wherein the evaluation of the maturity of the governance of the SOA includes a plurality of evaluations of the maturity of a plurality of governance domains and wherein the computer program product further comprises computer program instructions capable of:
- identifying, by one or more modules of automated computing machinery in the SOA governance maturity augmentation system, for each governance domain in dependence upon the evaluation of the maturity of the governance domain, one or more predefined risks to the SOA;
- establishing, by one or more modules of automated computing machinery in the SOA governance maturity augmentation system, for each governance domain in dependence upon the predefined risks to the SOA, a risk value representing the severity of the predefined risks;
- selecting, by one or more modules of automated computing machinery in the SOA governance maturity augmentation system, for each governance domain in dependence upon the evaluation of the maturity of the governance of the SOA and the predefined risk value, one or more governance work products;
- communicating, by one or more modules of automated computing machinery in the SOA governance maturity augmentation system, to predetermined stakeholders in the SOA the one or more predefined risks to the SOA identified for each governance domain, the risk value established for each governance domain, and the governance work products selected for each governance domain.

17. The computer program product of claim 16 further comprising computer program instructions capable of:
- assigning, by one or more modules of automated computing machinery in the SOA governance maturity augmentation system, for each governance domain, a cost value for carrying out the selected governance work products;
- wherein the cost value represents a degree of estimated cost of carrying out the governance work products for an governance domain; and
- communicating, by one or more modules of automated computing machinery in the SOA governance maturity augmentation system, to predetermined stakeholders in the SOA the cost value assigned for carrying out the selected governance work products for each governance domain.

18. The computer program product of claim 17 wherein computer program instructions capable of communicating, by one or more modules of automated computing machinery in the SOA governance maturity augmentation system, to predetermined stakeholders in the SOA the one or more predefined risks to the SOA identified for each governance domain, the risk value established for each governance domain, the governance work products selected for each governance domain, and the cost value assigned for carrying out the selected governance work products for each governance domain further comprise computer program instructions capable of dynamically creating, by one or more modules of automated computing machinery in the SOA governance maturity augmentation system, a report including the predefined risks, the risk values, the governance work products, and the cost values and transmitting the report to the predetermined stakeholders.

* * * * *